(12) United States Patent
Lee (10) Patent No.: US 10,447,954 B2
(45) Date of Patent: Oct. 15, 2019

(54) UNIT PIXEL APPARATUS AND OPERATION METHOD THEREOF

(71) Applicant: SK hynix Inc., Gyeonggi-do (KR)

(72) Inventor: Woong-Hee Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 260 days.

(21) Appl. No.: 15/478,492

(22) Filed: Apr. 4, 2017

(65) Prior Publication Data

US 2018/0027197 A1 Jan. 25, 2018

(30) Foreign Application Priority Data

Jul. 25, 2016 (KR) .................. 10-2016-0094053

(51) Int. Cl.
*H01L 27/00* (2006.01)
*H04N 5/361* (2011.01)
*H04N 5/363* (2011.01)
*H04N 5/3745* (2011.01)

(52) U.S. Cl.
CPC ............. *H04N 5/361* (2013.01); *H04N 5/363* (2013.01); *H04N 5/3745* (2013.01)

(58) Field of Classification Search
CPC ...... H04N 5/361; H04N 5/363; H04N 5/3745; H04N 5/378

USPC ............................. 250/208.1, 214 R; 348/308
See application file for complete search history.

(56) References Cited

U.S. PATENT DOCUMENTS 8,367,998 B2 * 2/2013 Ha ................... H01L 27/14609
250/208.1
2002/0163584 A1 * 11/2002 Kokubun ............. H04N 5/3594
348/308

FOREIGN PATENT DOCUMENTS

KR 100364605 12/2002
KR 101338589 12/2013

* cited by examiner

*Primary Examiner* — Kevin K Pyo
(74) *Attorney, Agent, or Firm* — IP & T Group LLP

(57) ABSTRACT

A unit pixel apparatus may include a plurality of unit pixels including a reset transistor, each unit pixel being suitable for outputting a pixel signal corresponding to incident light; a reset transistor gate voltage transmission unit suitable for transmitting a plurality of reset transistor gate voltages; and a first voltage switching unit suitable for transmitting a first supply voltage among the plurality of reset transistor gate voltages to a gate terminal of the reset transistor in each of the unit pixels during a period from an exposure start time to just before a readout time.

20 Claims, 7 Drawing Sheets

UNIT PIXEL APPARATUS AND OPERATION METHOD THEREOF

CROSS-REFERENCE TO RELATED APPLICATIONS

The present application claims priority of Korean Patent Application No. 10-2016-0094053, filed on Jul. 25, 2016, which is incorporated herein by reference in its entirety.

BACKGROUND

1. Field

Exemplary embodiments of the present invention relate to a complementary metal oxide semiconductor (CMOS) Image Sensor (CIS), and more particularly, to a unit pixel apparatus and an operation method thereof capable of reducing a degradation in a low light characteristic, which is caused by a dark current generated from an adjacent photo detecting device due to a gate voltage of a reset transistor.

2. Description of the Related Art

Figure 1:
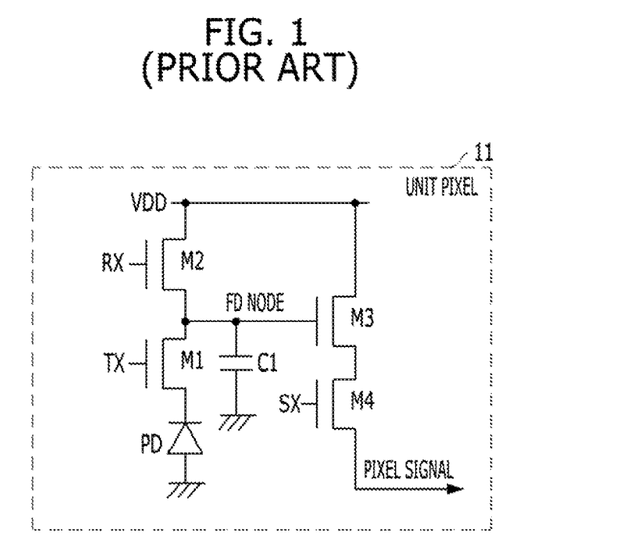
FIG. 1 is a diagram illustrating a conventional unit pixel.

FIG. 1 illustrates a conventional 4-transistor unit pixel 11.

Referring to FIG. 1, the unit pixel 11 may include a photo sensitive device PD, a transfer transistor M1, a reset transistor M2, a drive transistor M3 and a select transistor M4.

The photo sensitive device PD performs a photoelectric conversion function. That is, the photo sensitive device PD receives light from outside, and generates photo charges based on the received light. The photo sensitive device PD may be turned on or off in response to a control signal outputted from a controller (not illustrated). When the photo sensitive device PD is turned on, the photo sensitive device PD senses incident light and generates a photo charge. On the other hand, when the photo sensitive device PD is turned off, the photo sensitive device PD does not sense incident light. The photo sensitive device PD may be embodied by one or more of a photo diode, a photo transistor, a photo gate, a pinned photo diode (PPD) and combinations thereof.

The transfer transistor M1 may transmit the photo charges generated by the photo sensitive device PD coupled to a first terminal thereof to a floating diffusion node FD coupled to a second terminal thereof, in response to a transmission control signal TX applied to the gate terminal thereof from a row decoder (not illustrated).

The reset transistor M2 may transmit a first supply voltage VDD applied to a first terminal thereof (the drain terminal of M2) to the floating diffusion node FD coupled to a second terminal thereof, in response to a reset control signal RX applied to the gate terminal thereof from the row decoder. The reset transistor M2 may reset the photo charge stored in the floating diffusion node FD in response to the reset control signal RX. The first supply voltage VDD applied to the drain terminal of the reset transistor M2 may serve as a reset voltage from the viewpoint of the reset transistor M2.

The drive transistor M3 has a first terminal for receiving the first supply voltage VDD, generate an electrical signal corresponding to a charge stored in the floating diffusion node FD which is coupled to the gate terminal thereof, and output the generated electrical signal to a second terminal thereof. The drive transistor M3 may serve as a source follower buffer amplifier.

The select transistor M4 may output the electrical signal applied to a first terminal thereof from the drive transistor M3 as a pixel signal through a second terminal thereof in response to a select control signal SX applied to the gate terminal thereof from the row decoder. The select transistor M4 may perform a switching operation and address operation for selecting the unit pixel 11 amongst a plurality of pixels in a row of a pixel array (not shown) in response to the select control signal SX.

The floating diffusion node is a diffusion region which commonly constitutes the second terminals of the transfer transistor M1 and the reset transistor M2, and may store a charge corresponding to an image signal or reset voltage. The floating diffusion node may be modeled as a capacitor C1 of the floating diffusion node.

In a complementary metal oxide semiconductor (CMOS) Image Sensor (CIS) noise may be introduced into a dark or low light image. Thus, typically, a CIS employs a technique for controlling a leak current generated from the photo sensitive device and the floating diffusion node, and for reducing noise influence on image quality in a dark or low light Image.

Figure 2A:
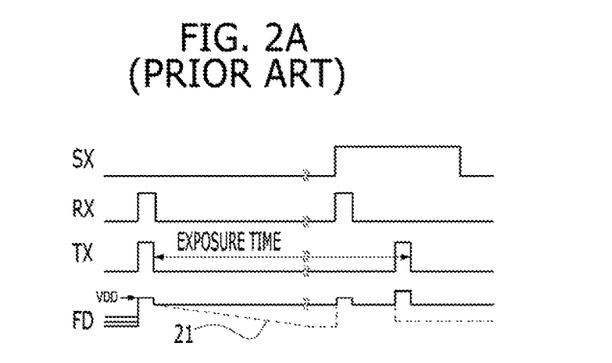
FIGS. 2A and 2B are diagrams illustrating signal readout timings and voltage changes of a floating diffusion node of the conventional unit pixel of FIG. 1.
Figure 2B:
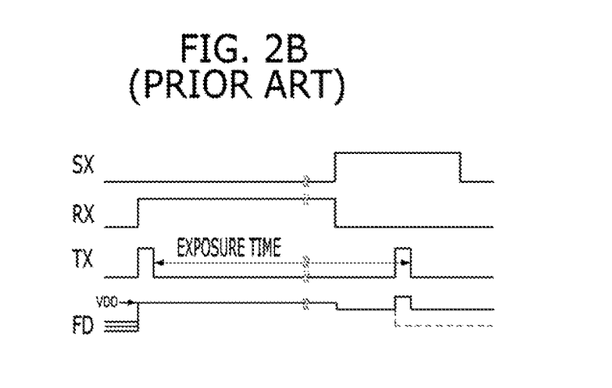

FIGS. 2A and 2B illustrate a signal readout timing and voltage change of the floating diffusion node FD of the unit pixel 11.

FIG. 2A illustrates setting the floating diffusion node in a floating state during a period from an exposure start time to just before a readout time, whereas FIG. 2B illustrates resetting the floating diffusion node during the same period.

When light is incident on the floating diffusion node or charges overflowing from the photo sensitive device (for example, photodiode PD) are introduced into the floating diffusion node during the period from the exposure start time to just before the readout time as indicated by reference numeral 21 in FIG. 2A, the voltage of the floating diffusion node may drop.

Recently, with the decrease of the pixel size, the off potential of the transfer transistor M1 has been increased in order to secure the capacity of the photo sensitive device. Thus, it has become important to control the blooming effect.

In the case of the floating diffusion node FD, when a junction node between pixels is retained at a high voltage, a part of charges overflowing from the photo sensitive device to another adjacent pixel may be captured.

Thus, in order to control the blooming effect, the floating diffusion node may be reset to the first supply voltage (e.g., VDD) through an operation of setting the reset control signal RX to a high level during the period from the exposure start time to just before the readout time as illustrated in FIG. 2B.

At this time, in order to clamp the floating diffusion node to the first supply voltage, a voltage higher by the threshold voltage of the reset transistor M2 than the first supply voltage is applied as the gate voltage of the reset transistor M2, such that the reset transistor M2 is operated in the linear region.

For example, when the first supply voltage VDD is set to 2.8V and the threshold voltage of the reset transistor M2 is set to 0.2V, the gate voltage of the reset transistor M2 must be equal to or more than 3.0V, such that the reset voltage of the floating diffusion node can be clamped to the first supply voltage. At this time, a circuit for supplying a higher voltage than the first supply voltage may be implemented by a positive charge pump, for example.

Figure 3A:
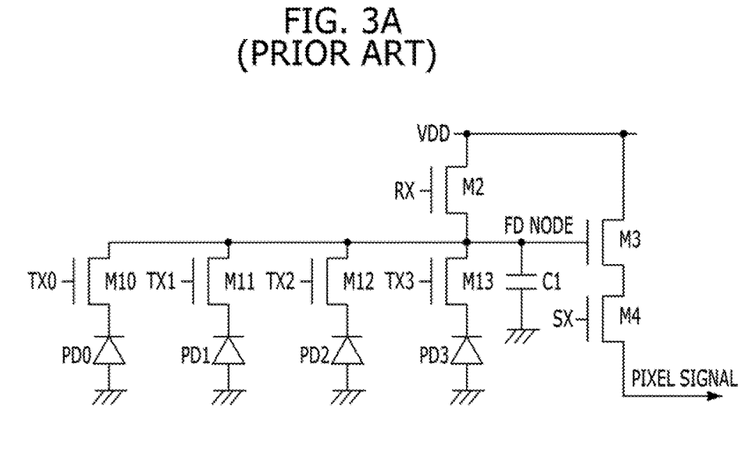
FIGS. 3A and 3B are diagrams illustrating a conventional configuration and layout of 2×2 shared type unit pixels.
Figure 3B:
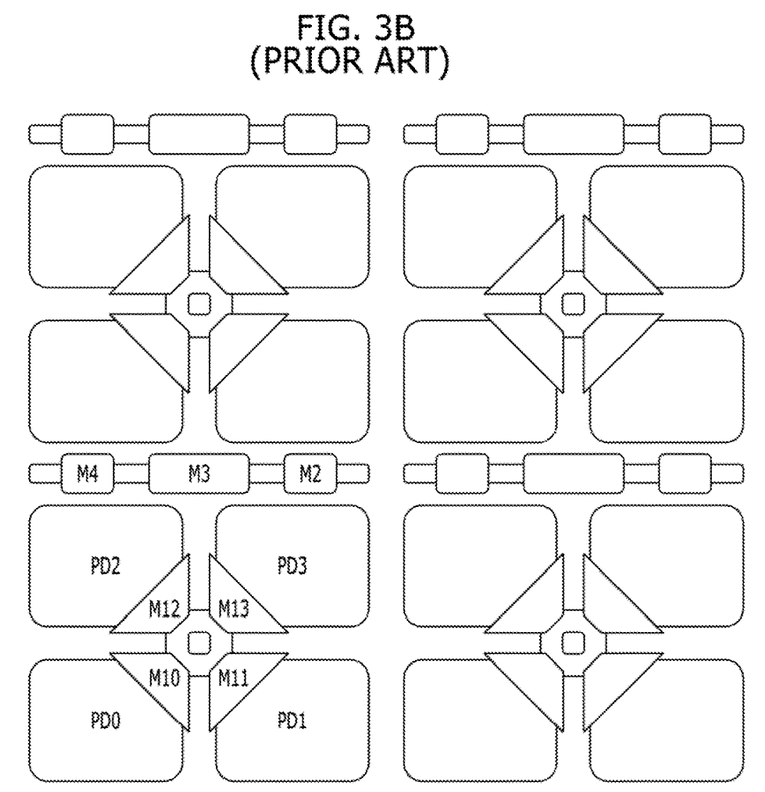

FIGS. 3A and 3B are diagrams illustrating the configuration and layout of conventional 2×2 shared type unit pixels. Since the 2×2 shared type unit pixels are publicly known, detailed descriptions thereof are omitted herein.

Referring to FIG. 3B, one concern with such conventional layout is that a reset transistor M2 is located adjacent to a specific photo sensitive device (for example, PD3). As a result, when a high level bias voltage is applied to the gate terminal of the reset transistor M2, a dark current may be generated in the adjacent photo sensitive device PD3 by the high gate voltage of the reset transistor M2, and degrade the low-light characteristic.

SUMMARY

Various embodiments are directed to a unit pixel apparatus capable of reducing a degradation in low-light characteristic during an operation of resetting a floating diffusion node from an exposure start time to just before a readout time, in order to improve a blooming effect, and an operation method thereof.

Various embodiments are directed to a unit pixel apparatus capable of performing a floating diffusion node reset operation from an exposure start time to just before a readout time, and controlling a gate voltage of a reset transistor during the period from the exposure start time to just before the readout time.

In an embodiment, a unit pixel apparatus may include a plurality of unit pixels including a reset transistor, each unit pixel being suitable for outputting a pixel signal corresponding to incident light; a reset transistor gate voltage transmission unit suitable for transmitting a plurality of reset transistor gate voltages; and a first voltage switching unit suitable for transmitting a first supply voltage among the plurality of reset transistor gate voltages to a gate terminal of the reset transistor in each of the unit pixels during a period from an exposure start time to just before a readout time.

The unit pixel apparatus may further include a reset transistor gate voltage supply unit suitable for supplying a reset transistor gate voltage to the reset transistor gate voltage transmission unit, wherein the first voltage switching unit selects the reset transistor gate voltage from the reset transistor gate voltage supply unit among the plurality of reset transistor gate voltages from the reset transistor gate voltage transmission unit and transmits the selected voltage to the gate terminal of the reset transistor in each of the unit pixels according to a control signal, during the period from the exposure start time to just before the readout time.

The unit pixel apparatus may further include a floating diffusion node reset voltage supply unit suitable for supplying a floating diffusion node reset voltage; and a second supply voltage switching unit suitable for transmitting the floating diffusion node reset voltage to the drain terminal of the reset transistor in each of the unit pixels during the period from the exposure start time to the readout time, according to the control signal.

In an embodiment, an operation method of a unit pixel apparatus may include applying a first supply voltage from a reset transistor gate voltage transmission unit to a gate terminal of a reset transistor in each of unit pixels according to a control signal, during a period from an exposure start time to just before a readout time; and applying a second supply voltage from the reset transistor gate voltage transmission unit to the gate terminal of the reset transistor in each of the unit pixels according to an inverted control signal, during reset periods other than the period from the exposure start time to just before the readout time.

The operation method may further include supplying a voltage lower than the first supply voltage to the reset transistor gate voltage transmission unit, wherein the applying of the first supply voltage comprises applying the voltage lower than the first supply voltage from the reset transistor gate voltage transmission unit to the gate terminal of the reset transistor in each of the unit pixels according to the control signal, during the period from the exposure start time to just before the readout time.

The applying of the first supply voltage may further include applying a floating diffusion node reset voltage from a floating diffusion node reset voltage supply unit to the drain terminal of the reset transistor in each of the unit pixels according to the control signal, during the period from the exposure start time to just before the readout time, and the applying of the second supply voltage may further include applying the first supply voltage to the drain terminal of the reset transistor in each of the unit pixels according to the inverted control signal, during reset periods other than the period from the exposure start time to just before the readout time.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Throughout the specification, when one element is referred to as being 'connected to' or 'coupled to' another element, it may indicate that the former element is directly connected or coupled to the latter element or electrically connected or coupled to the latter element with another element interposed therebetween. It will be further understood that the terms "comprises," "comprising," "includes," and "including" when used in this specification, specify the presence of the stated elements and do not preclude the presence or addition of one or more other elements. Furthermore, it is noted that although various elements described in the specification may be described in a singular form, the present embodiment is not limited thereto, and the corresponding elements may also be represented in a plural form.

Figure 4:
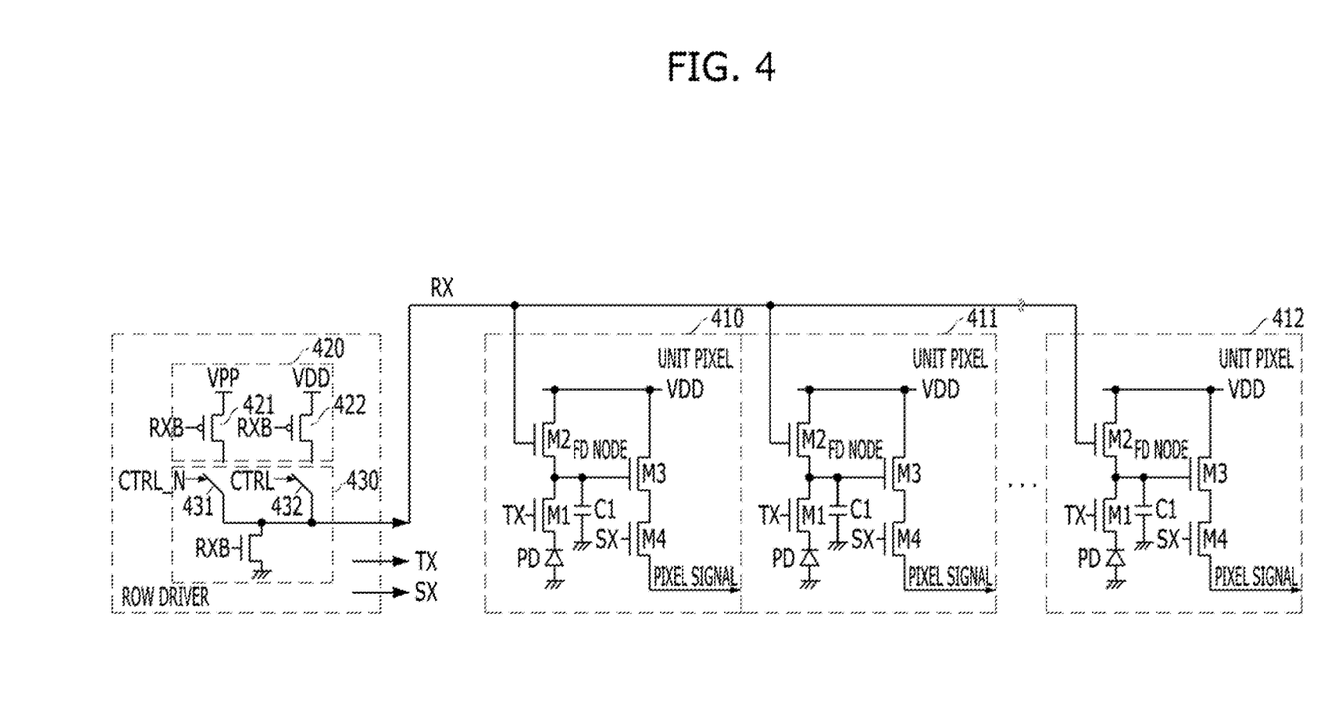
FIG. 4 is a diagram illustrating a unit pixel apparatus in accordance with an embodiment of the present invention.

FIG. 4 is a diagram illustrating a unit pixel apparatus in accordance with an embodiment of the present invention.

Referring to FIG. 4, the unit pixel apparatus may include a plurality of unit pixels 410 to 412, a reset transistor gate voltage transmission unit 420 and a first voltage switching unit 430. The plurality of unit pixels 410 to 412 may each output a pixel signal corresponding to incident light. Because each of the plurality of unit pixels 410 to 412 has the same construction and performs the same function as the unit pixel 11 shown in FIG. 1, the descriptions for each of the plurality of unit pixels 410 to 412 will be omitted. The reset transistor gate voltage transmission unit 420 may transmit a plurality of reset transistor gate voltages according to an inverted reset control signal RXB. The first voltage switching unit 430 may select a first supply voltage VDD among the plurality of reset transistor gate voltages provided from the reset transistor gate voltage transmission unit 420 during a period from an exposure start time to just before a readout time, according to a control signal CTRL or CTRL_N provided from an external controller (not illustrated), and transmit the first supply voltage VDD to the gate terminal of the reset transistor M2 in each of the unit pixels 410 to 412.

A complementary metal oxide semiconductor (CMOS) Image Sensor (CIS) using a rolling shutter scheme may have a characteristic that the exposure time is changed on a row basis. Therefore, the gate voltage of the reset transistor M2 at each row needs to be separately controlled during the period from the exposure start time to just before the readout time.

However, a row driver that drives the transistors in the unit pixels 410 to 412 may include a reset transistor driver which is implemented as an inverter-type simple circuit.

Thus, in the present embodiment, while the reset control signal RX is high or the inverted reset control signal RXB is low, the gate voltage of the reset transistor M2 may be controlled to a second supply voltage VPP or the first supply voltage VDD according to the control signal CTRL or CTRL_N from the external controller.

At this time, the second supply voltage VPP may be formed by a positive charge pump circuit, for example, and include a voltage higher by the threshold voltage of the reset transistor M2 than the first supply voltage VDD. The first and second supply voltages may be received from outside the row driver.

The reset transistor gate voltage transmission unit 420 may include a first transmitter 421 and a second transmitter 422. The first transmitter 421 may transmit the second supply voltage VPP according to the inverted reset control signal RXB, and the second transmitter 422 may transmit the first supply voltage VDD according to the inverted reset control signal RXB. At this time, as illustrated in FIG. 4, the first and second transmitters 421 and 422 may each be implemented using a PMOS transistor operated according to the inverted reset control signal RXB. Alternatively, the second transmitter 422 may also be implemented using a PMOS transistor and an NMOS transistor arranged in parallel to each other. The PMOS transistor may be operated according to the inverted reset control signal RXB, and the NMOS transistor may be operated according to an in-phase reset control signal RXP.

The first voltage switching unit 430 may be operated according to the control signal CTRL or CTRL_N, and switch any one voltage among the plurality of reset transistor gate voltages provided from the reset transistor gate voltage transmission unit 420 to the gate terminal of the reset transistor M2 in each of the unit pixels 410 to 412. In the embodiment of FIG. 4, the first and second supply voltages VDD and VPP may be applied to the gates of the reset transistors M2. The first voltage switching unit 430 may be embodied in various forms. For example, the first voltage switching unit 430 of FIG. 4 may include a first switch 431 and a second switch 432. The first switch 431 may be operated according to the control signal CTRL_N, and switch the second supply voltage VPP from the reset transistor gate voltage transmission unit 420 to the gate terminal of the reset transistor M2 in each of the unit pixels 410 to 412. The second switch 432 may be operated according to the control signal CTRL, and switch the first supply voltage VDD from the reset transistor gate voltage transmission unit 420 to the gate terminal of the reset transistor M2 in each of the unit pixels 410 to 412.

In the present embodiment, the reset transistor gate voltage transmission unit 420 and the first voltage switching unit 430 may be implemented in the row driver which drives the transistor of a unit pixel. In order to apply the voltage (i.e., gate voltage RX of the reset transistor) inputted to the gate terminal of the reset transistor M2 as different voltages during the period from the exposure start time to just before the readout time and the other reset periods, respectively, the reset transistor gate voltage transmission unit 420 and the inverted reset control signal RXB for controlling the reset transistor gate voltage transmission unit 420 may be implemented, and the first voltage switching unit 430 and the control signal CTRL for controlling the first voltage switching unit 430 may be implemented. Here, RXB may represent the inverted signal of RX, RXP may represent the inverted signal of RXB, and CTRL_N may represent the inverted signal of CTRL.

That is, during the period from the exposure start time to just before the readout time, the control signal CTRL may be set to a high level, and the first supply voltage VDD may be applied to the gate terminal of the reset transistor M2 in each of the unit pixels 410 to 412. Furthermore, during the reset periods other than the period from the exposure start time to just before the readout time, the control signal CTRL_N may be set to a high level, and the second supply voltage VPP may be applied to the gate terminal of the reset transistor M2 in each of the unit pixels 410 to 412. At this time, the control signals CTRL and CTRL_N may be received from an external controller (for example, timing generator).

Even when the rolling shutter is not used but a global shutter is used, the gate voltage of the reset transistor M2 may be separately controlled from the exposure start time to just before the readout time.

Figure 5:
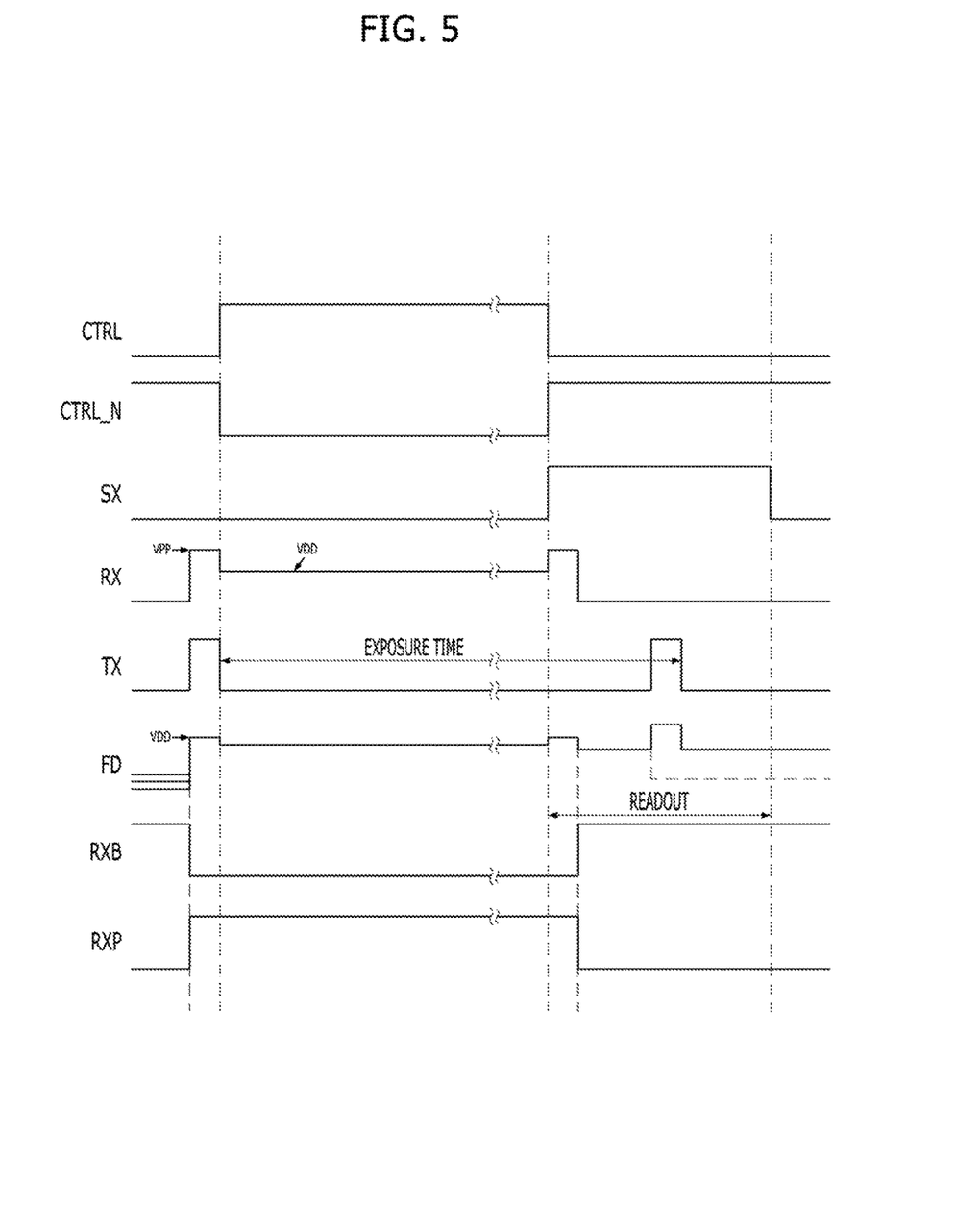
FIG. 5 is a timing diagram illustrating an operation of the unit pixel apparatus of FIG. 4.

FIG. 5 is a timing diagram illustrating an operation of the unit pixel apparatus shown in FIG. 4.

Referring to FIG. 5, the control signal CTRL for controlling the second switch 432 of the first voltage switching unit 430 is set to a high level during the period from the exposure start time to just before the readout time, in order to control the gate voltage of the reset transistor M2.

That is, during the period from the exposure start time to just before the readout time, the control signal CTRL for controlling the second switch 432 of the first voltage switching unit 430 may be set to a high level, and the gate voltage RX of the reset transistor M2 may be changed from the second supply voltage VPP to the first supply voltage VDD. Thus, while improving the blooming effect, the unit pixel apparatus can reduce a degradation in low-light characteristic, the degradation being caused by a dark current generated by an adjacent photo sensitive device due to a high gate voltage of the reset transistor M2.

The present embodiment may be applied to the global shutter scheme as well as the rolling shutter scheme. Furthermore, the present embodiment may be applied to not only a unit pixel with a 4-transistor structure but also a unit pixel with a different sharing structure.

As described above, when the gate voltage RX of the reset transistor M2 is high, the low-light characteristic may be degraded by a dark current generated by an adjacent photo sensitive device. Thus, the gate voltage RX of the reset transistor M2 may be set to as a low level as possible, in terms of the low-light characteristic.

In another embodiment, the unit pixel apparatus may additionally include a circuit which can supply a voltage lower than the first supply voltage VDD to the gate terminal of the reset transistor M2 in each of the unit pixels 410 to 412 during the period from the exposure start time to just before the readout time, according to the high-level control signal CTRL. This configuration will be described in detail with reference to FIG. 6.

Figure 6:
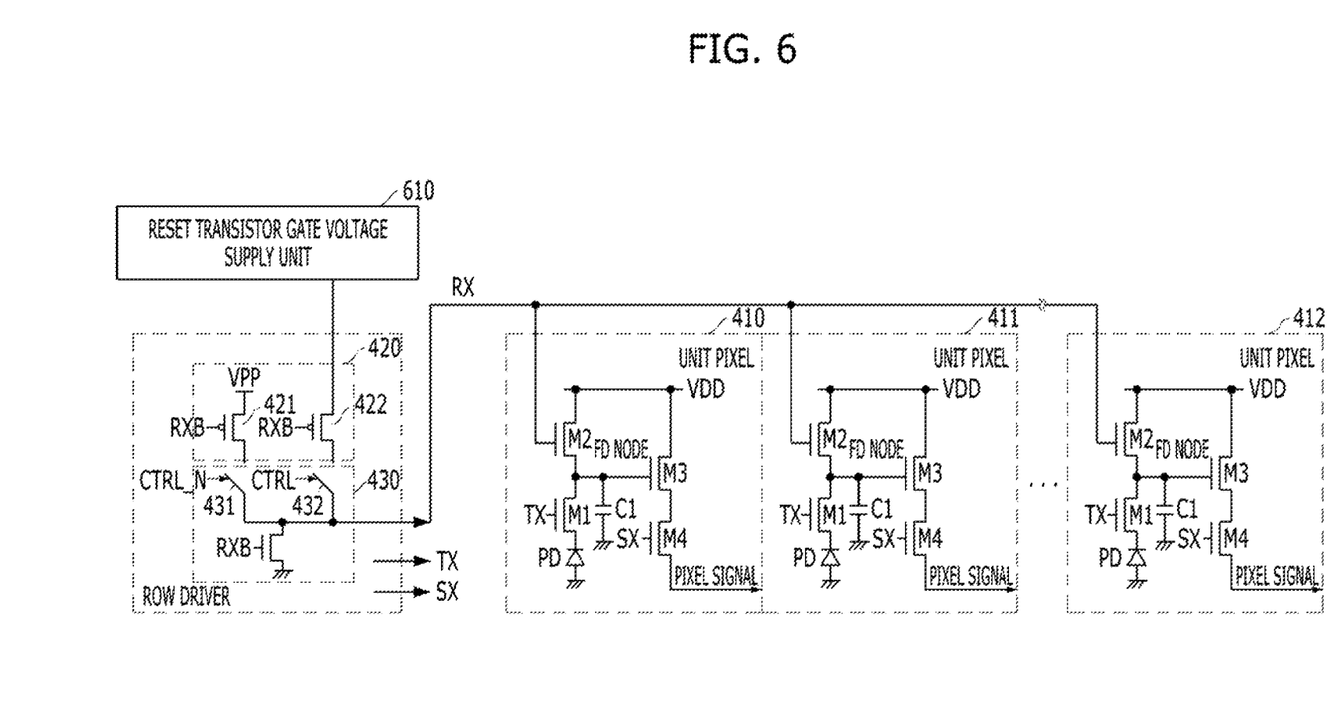
FIG. 6 is a diagram illustrating a unit pixel apparatus in accordance with another embodiment of the present invention.

FIG. 6 is a diagram illustrating a unit pixel apparatus in accordance with another embodiment. The unit pixel apparatus may be configured and operated in almost the same manner as described with reference to FIG. 4. Thus, the following descriptions will be focused on the differences therebetween.

Referring to FIG. 6, the unit pixel apparatus may include a plurality of unit pixels 410 to 412, a reset transistor gate voltage supply unit 610, a reset transistor gate voltage transmission unit 420 and a first voltage switching unit 430. Each of the plurality of unit pixels 410 to 412 may output a pixel signal corresponding to incident light. The reset transistor gate voltage supply unit 610 may supply a reset transistor gate voltage. The reset transistor gate voltage transmission unit 420 may transmit a plurality of reset transistor gate voltages according to an inverted reset control signal RXB. The plurality of reset transistor gate voltages may include the reset transistor gate voltage supplied from the reset transistor gate voltage supply unit 610. The first voltage switching unit 430 may select the reset transistor gate voltage supplied from the reset transistor gate voltage supply unit 610 among the plurality of reset transistor gate voltages from the reset transistor gate voltage transmission unit 420 during a period from an exposure start time to just before a readout time, according to a control signal CTRL or CTRL_N from an external controller (not Illustrated), and transmit the selected voltage to the gate terminal of a reset transistor M2 in each of the unit pixels 410 to 412.

In the present embodiment, while the reset control signal RX is high or the inverted reset control signal RXB is low, the gate voltage of the reset transistor M2 may be controlled to the second supply voltage VPP or the reset transistor gate voltage from the reset transistor gate voltage supply unit 610, according to the control signal CTRL or CTRL_N from the external controller.

When the second transmitter 422 of the reset transistor gate voltage transmission unit 420 is implemented by a PMOS transistor, the reset transistor gate voltage supply unit 610 may supply a voltage ranging from the threshold voltage of the PMOS transistor to the first supply voltage VDD as the reset transistor gate voltage. Furthermore, when the second transmitter 422 of the reset transistor gate voltage transmission unit 420 is implemented by a PMOS transistor and an NMOS transistor which are arranged in parallel, the reset transistor gate voltage supply unit 610 may supply a voltage ranging from the threshold voltage of the reset transistor M2 to the first supply voltage VDD as the reset transistor gate voltage.

In the present embodiment, the reset transistor gate voltage transmission unit 420 and the first voltage switching unit 430 may be implemented in a row driver ROW DRIVER which drives the transistor of a unit pixel, and the reset transistor gate voltage supply unit 610 may be implemented outside the row driver ROW DRIVER. At this time, during the period from the exposure start time to just before the readout time, the control signal CTRL may be set to a high level, and the reset transistor gate voltage supplied from the reset transistor gate voltage supply unit 610 may be applied to the gate terminal of the reset transistor M2 in each of the unit pixels 410 to 412, the reset transistor gate voltage being lower than the first supply voltage VDD. Furthermore, during the reset periods other than the period from the exposure start time to just before the readout time, the control signal CTRL_N may be set to a high level, and the second supply voltage VPP may be applied to the gate terminal of the reset transistor M2 in each of the unit pixels 410 to 412.

When a floating diffusion node reset voltage becomes considerably low, a floating diffusion node may capture a part of an oversaturated signal, and thus reduce the improvement of the blooming effect. Thus, the reset transistor gate voltage supply unit 610 may supply a voltage ranging from the lowest voltage to the first supply voltage VDD, taking into consideration of the blooming effect.

The first supply voltage may be applied as the drain voltage of the reset transistor M2, and a voltage equal to or less than the first supply voltage VDD may be applied as the gate voltage of the reset transistor M2 ensuring that the reset transistor M2 may always operate in the saturation region.

In this case, the floating diffusion node reset voltage may not be fixed to a specific voltage, but changed from the voltage level around the first supply voltage VDD, depending on the surrounding situation, unlike when the reset transistor M2 operates in a linear region.

Thus, the drain voltage (i.e., floating diffusion node reset voltage) of the reset transistor M2 may be controlled during the period from the exposure start time to just before the readout time. This configuration will be described in detail with reference to FIGS. 7 and 8.

Figure 7:
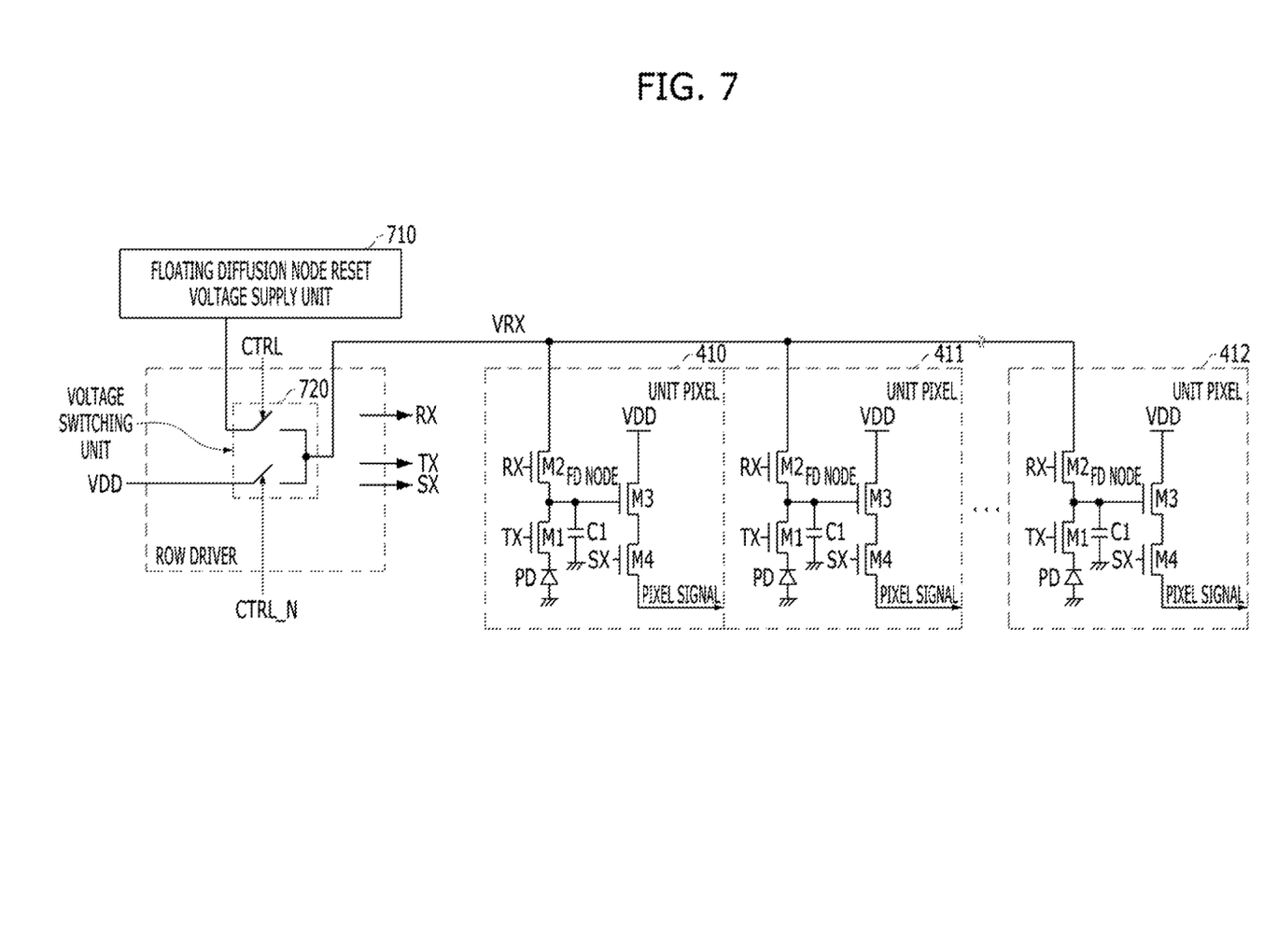
FIG. 7 is a diagram illustrating a floating diffusion node reset voltage supply device applied to the unit pixel apparatus of FIG. 6.

FIG. 7 is a diagram illustrating a floating diffusion node reset voltage supply device applied to a unit pixel apparatus in accordance with an embodiment.

Referring to FIG. 7, the floating diffusion node reset voltage supply device applied to the unit pixel apparatus may include a floating diffusion node reset voltage supply unit 710 and a second voltage switching unit 720. The floating diffusion node reset voltage supply unit 710 may supply a floating diffusion node reset voltage. The second voltage switching unit 720 may transmit the floating diffusion node reset voltage from the floating diffusion node reset voltage supply unit 710 to the drain terminal of the reset transistor M2 in each of the unit pixels 410 to 412 during the period from the exposure start time to just before the readout time, according to the control signal CTRL or CTRL_N from an external controller (not illustrated).

At this time, the CIS using the rolling shutter scheme may have a characteristic that the exposure time is changed on a row basis. Thus, in order to control the floating diffusion node reset voltage at each row from the exposure start time to just before the readout time, the voltage applied to the drain terminal of the reset transistor M2 and the voltage applied to the drain terminal of the drive transistor M3 may be separated from each other.

In the present embodiment, the second voltage switching unit 720 may be implemented in the row driver ROW DRIVER. Here, the second voltage switching unit 720 and the control signal CTRL for controlling the second voltage switching unit 720 may be implemented in order to apply the voltage VRX (i.e., floating diffusion node reset voltage) inputted to the drain terminal of the reset transistor M2 as different voltages during the period from the exposure start time to just before the readout time and the other reset periods, respectively. At this time, CTRL_N may represent an inverted signal of CTRL. That is, during the period from the exposure start time to just before the readout time, the control signal CTRL may be set to a high level, and the floating diffusion node reset voltage from the floating diffusion node reset voltage supply unit 710 may be applied to the drain terminal of the reset transistor M2 in each of the unit pixels 410 to 412. Furthermore, during the reset periods other than the period from the exposure start time to just before the readout time, the control signal CTRL_N may be set to a high level, and the first supply voltage VDD may be applied to the drain terminal of the reset transistor M2 in each of the unit pixels 410 to 412.

The floating diffusion node reset voltage supply unit 710 which supplies the floating diffusion node reset voltage may be configured to supply a voltage ranging from the first supply voltage VDD/2 to the first supply voltage VDD, in consideration of the blooming effect. The floating diffusion node reset voltage supply unit 710 may also be configured to supply a voltage ranging from 0V to the first supply voltage VDD, when the blooming effect is removed through another method.

However, when the drain voltage of the reset transistor M2 is controlled to less than the first supply voltage VDD while the gate voltage of the reset transistor M2 is lowered from the second supply voltage VPP to the first supply voltage VDD during the period from the exposure start time to just before the readout time, the floating diffusion node reset voltage may be fixed to a specific voltage. At this time, the drain voltage of the reset transistor M2 may be controlled to a voltage, which is lower than the threshold voltage of the reset transistor M2, from the first supply voltage VDD.

Furthermore, referring again to FIG. 6, when the second transmitter 422 of the reset transistor gate voltage transmission unit 420 is embodied by a PMOS transistor, a voltage higher by the threshold voltage of the PMOS transistor than the drain voltage of the reset transistor M2 may be applied as the gate voltage of the reset transistor M2. Furthermore, when the second transmitter 422 of the reset transistor gate voltage transmission unit 420 is embodied by a PMOS transistor and an NMOS transistor which are arranged in parallel to each other, a voltage higher by the threshold voltage of the reset transistor M2 than the drain voltage of the reset transistor M2 may be applied as the gate voltage of the reset transistor M2.

The above-described floating diffusion node reset voltage in FIG. 7 is only an example, and the preset embodiment is not limited thereto. The floating diffusion node reset voltage can be controlled to a range lower than the first supply voltage level.

Even when the global shutter is used instead of the rolling shutter, the floating diffusion node reset voltage can be controlled from the exposure start time to just before the readout time.

In the global shutter scheme, however, the exposure times of all rows are equal to each other. Thus, in the global shutter scheme, unlike in the rolling shutter scheme, a voltage applied to the drain terminal of the reset transistor M2 in a row basis and a voltage applied to the drain terminal of the drive transistor M3 in a row basis may not be separated from each other.

Figure 8:
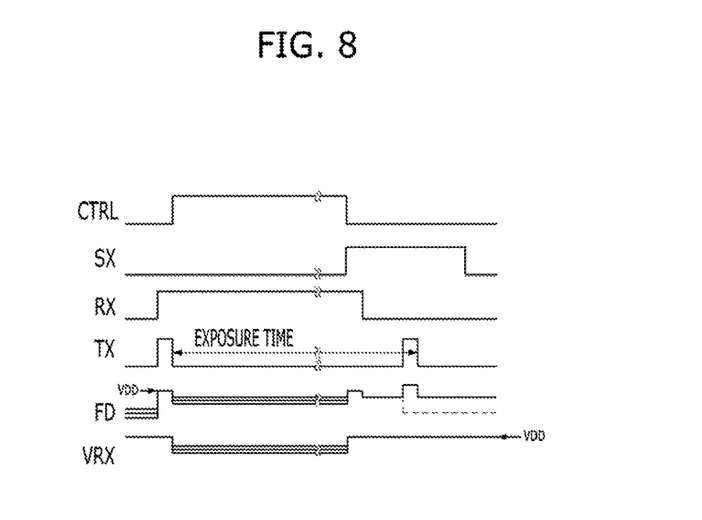
FIG. 8 is a timing diagram illustrating an operation of the unit pixel apparatus of FIG. 6 when the floating diffusion node reset voltage supply device is applied to the unit pixel apparatus in accordance with the embodiment of FIG. 7.

FIG. 8 is a timing diagram illustrating an operation of the unit pixel apparatus as shown in FIG. 7, when the floating diffusion node reset voltage supply device is applied to the unit pixel apparatus in accordance with the present embodiment.

Referring to FIG. 8, the control signal CTRL for controlling the second voltage switching unit 720 may be set to a high level during the period from the exposure start time to just before the readout time, in order to control the floating diffusion node reset voltage.

That is, during the period from the exposure start time to just before the readout time, the control signal CTRL for controlling the voltage switch may be set to a high level, such that the floating diffusion node reset voltage (i.e., voltage of VRX node) is set to a voltage value ranging from one half of the first supply voltage ("VDD/2") to the first supply voltage VDD. Thus, while improving the blooming effect, the unit pixel apparatus can also reduce a degradation of low-light characteristic by a leak current of the floating diffusion node, which occurs due to an excessive reverse bias voltage applied to the floating diffusion node.

At this time, during a period in which the transfer transistor is operated at a high level, the floating diffusion node reset voltage (i.e., voltage of VRX node) may be retained at the first supply voltage VDD. This is because the voltage of the floating diffusion node may have an influence on the characteristics of a signal charge that the photodiode PD transmits to the floating diffusion node.

Figure 9:
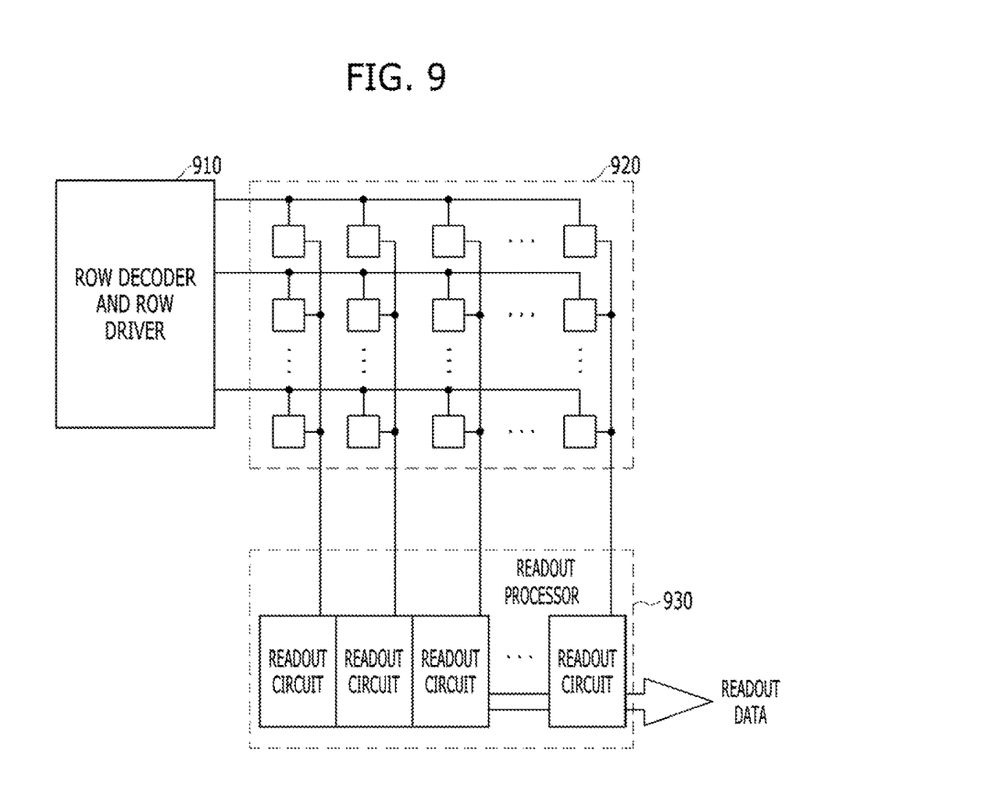
FIG. 9 is a diagram of a complementary metal oxide semiconductor (CMOS) Image Sensor (CIS) including a unit pixel apparatus in accordance with an embodiment of the present invention.

FIG. 9 is a diagram of a complementary metal oxide semiconductor (CMOS) Image Sensor (CIS) to which a unit pixel apparatus in accordance with the present embodiment is applied.

Referring to FIG. 9, the CIS may include a row decoder and row driver 910, a pixel array 920 and a readout processor 930.

The row decoder and row driver 910 may include a row decoder and a row driver, the row driver driving pixels selected by the row decoder among a plurality of pixels implemented in the pixel array 920. In some embodiments, as shown in FIGS. 4 and 6, the reset transistor gate voltage transmission unit 420 and the first voltage switching unit 430 may be implemented in the row driver ROW DRIVER. Alternatively, as shown in FIG. 7, the second voltage switching unit 720 may be implemented in the row driver ROW DRIVER.

The pixel array 920 may sense light using an optical element, and generate a pixel signal (i.e., pixel output signal) corresponding to the sensed light. At this time, a pixel which is selected and driven by the row decoder, among the pixels included in the pixel array 920, may output the pixel signal. The output pixel signal is an analog pixel signal corresponding to an electrical signal, and may include a reset voltage and a signal voltage.

The readout processor 930 may read out the pixel signal outputted from the pixel array 920, and output the readout pixel signal as the readout data.

In accordance with the present embodiment, when performing an operation of resetting the floating diffusion node to the first supply voltage VDD during the period from the exposure start time to just before the readout time in order to improve the blooming characteristic, the unit pixel apparatus may control the gate voltage of the reset transistor and apply a voltage lower than the first supply voltage VDD during the period from the exposure start time to the readout time, in order to reduce a degradation in low-light characteristic, which is caused by a dark current generated in an adjacent photo sensitive device due to a high gate voltage of the reset transistor. Thus, the unit pixel apparatus can reduce the degradation in low-light characteristic while at the same time improving the blooming effect.

Although various embodiments have been described for illustrative purposes, it will be apparent to those skilled in the art that various changes and modifications may be made without departing from the spirit and scope of the invention as defined in the following claims.

What is claimed is:

1. A unit pixel apparatus comprising:
   a plurality of unit pixels including a reset transistor, each unit pixel being suitable for outputting a pixel signal corresponding to incident light;
   a reset transistor gate voltage transmission unit suitable for transmitting a plurality of reset transistor gate voltages; and
   a first voltage switching unit suitable for transmitting a first supply voltage among the plurality of reset transistor gate voltages to a gate terminal of the reset transistor in each of the unit pixels during a period from an exposure start time to just before a readout time.

2. The unit pixel apparatus of claim 1, wherein the reset transistor gate voltage transmission unit comprises:
   a first transmitter suitable for transmitting a second supply voltage to the first voltage switching unit according to an inverted reset control signal; and
   a second transmitter suitable for transmitting the first supply voltage to the first voltage switching unit according to a reset control signal.

3. The unit pixel apparatus of claim 1, wherein the first voltage switching unit comprises:
   a first switch suitable for switching a second supply voltage from the reset transistor gate voltage transmission unit to the gate terminal of the reset transistor in each of the unit pixels according to an inverted control signal; and
   a second switch suitable for switching the first supply voltage from the reset transistor gate voltage transmission unit to the gate terminal of the reset transistor according to a control signal.

4. The unit pixel apparatus of claim 1, wherein the first voltage switching unit changes the gate voltage of the reset transistor from a second supply voltage among the plurality of supply voltages to the first supply voltage during the period from the exposure start time to just before the readout time, according to a control signal and an inverted control signal.

5. The unit pixel apparatus of claim 1, wherein the first voltage switching unit applies the first supply voltage to the gate terminal of the reset transistor in each of the unit pixels according to a control signal, during the period from the exposure start time to just before the readout time, and applies a second supply voltage from the reset transistor gate voltage transmission unit to the gate terminal of the reset transistor in each of the unit pixels according to an inverted control signal, during reset periods other than the period from the exposure start time to just before the readout time.

6. The unit pixel apparatus of claim 1, wherein the reset transistor gate voltage transmission unit and the first voltage switching unit are implemented in a row driver.

7. The unit pixel apparatus of claim 2, further comprising a reset transistor gate voltage supply unit suitable for supplying a reset transistor gate voltage to the reset transistor gate voltage transmission unit,
   wherein the first voltage switching unit selects the reset transistor gate voltage from the reset transistor gate voltage supply unit among the plurality of reset transistor gate voltages from the reset transistor gate voltage transmission unit and transmits the selected voltage to the gate terminal of the reset transistor in each of the unit pixels according to a control signal, during the period from the exposure start time to just before the readout time.

8. The unit pixel apparatus of claim 7, wherein the reset transistor gate voltage is lower than the first supply voltage.

9. The unit pixel apparatus of claim 7, wherein the first voltage switching unit applies a voltage lower than the first supply voltage from the reset transistor gate voltage transmission unit to the gate terminal of the reset transistor in each of the unit pixels according to the control signal, during the period from the exposure start time to just before the readout time, and applies a second supply voltage from the reset transistor gate voltage transmission unit to the gate terminal of the reset transistor in each of the unit pixels according to an inverted control signal, during reset periods other than the period from the exposure start time to just before the readout time.

10. The unit pixel apparatus of claim 7, wherein the reset transistor gate voltage transmission unit and the first voltage switching unit are implemented in a row driver, and
    the reset transistor gate voltage supply unit is implemented outside the row driver.

11. The unit pixel apparatus of claim 7, wherein when the second transmitter of the reset transistor gate voltage transmission unit includes a PMOS transistor, the reset transistor gate voltage supply unit supplies a voltage value ranging from the threshold voltage of the PMOS transistor to the first supply voltage as the reset transistor gate voltage.

12. The unit pixel apparatus of claim 7, wherein when the second transmitter of the reset transistor gate voltage transmission unit includes a PMOS transistor and an NMOS transistor which are arranged in parallel to each other, the reset transistor gate voltage supply unit supplies a voltage value ranging from the threshold voltage of the reset transistor to the first supply voltage as the reset transistor gate voltage.

13. The unit pixel apparatus of claim 8, further comprising:
    a floating diffusion node reset voltage supply unit suitable for supplying a floating diffusion node reset voltage; and
    a second supply voltage switching unit suitable for transmitting the floating diffusion node reset voltage to the drain terminal of the reset transistor in each of the unit pixels during the period from the exposure start time to the readout time, according to the control signal.

14. The unit pixel apparatus of claim 13, wherein the second voltage switching unit applies the floating diffusion node reset voltage to the drain terminal of the reset transistor in each of the unit pixels according to the control signal, during the period from the exposure start time to just before the readout time, and applies the first supply voltage to the drain terminal of the reset transistor in each of the unit pixels according to an inverted control signal, during reset periods other than the period from the exposure start time to just before the readout time.

15. The unit pixel apparatus of claim 13, wherein when the second transmitter of the reset transistor gate voltage transmission unit includes a PMOS transistor, a voltage higher by the threshold voltage of the PMOS transistor than the drain voltage of the reset transistor is applied as the gate voltage of the reset transistor.

16. The unit pixel apparatus of claim 13, wherein when the second transmitter of the reset transistor gate voltage transmission unit includes a PMOS transistor and an NMOS transistor which are arranged in parallel to each other, a voltage higher by the threshold voltage of the reset transistor than the drain voltage of the reset transistor is applied as the gate voltage of the reset transistor.

17. The unit pixel apparatus of claim 1, further comprising:
a floating diffusion node reset voltage supply unit suitable for supplying a floating diffusion node reset voltage; and
a second voltage switching unit suitable for transmitting the floating diffusion node reset voltage to the drain terminal of the reset transistor in each of the unit pixels during the period from the exposure start time to just before the readout time, according to the control signal.

18. An operation method of a unit pixel apparatus, comprising:
applying a first supply voltage from a reset transistor gate voltage transmission unit to a gate terminal of a reset transistor in each of unit pixels according to a control signal, during a period from an exposure start time to just before a readout time; and
applying a second supply voltage from the reset transistor gate voltage transmission unit to the gate terminal of the reset transistor in each of the unit pixels according to an inverted control signal, during reset periods other than the period from the exposure start time to just before the readout time.

19. The operation method of claim 18, further comprising supplying a voltage lower than the first supply voltage to the reset transistor gate voltage transmission unit,
wherein the applying of the first supply voltage comprises applying the voltage lower than the first supply voltage from the reset transistor gate voltage transmission unit to the gate terminal of the reset transistor in each of the unit pixels according to the control signal, during the period from the exposure start time to just before the readout time.

20. The operation method of claim 18, wherein the applying of the first supply voltage further comprises applying a floating diffusion node reset voltage from a floating diffusion node reset voltage supply unit to the drain terminal of the reset transistor in each of the unit pixels according to the control signal, during the period from the exposure start time to just before the readout time, and
the applying of the second supply voltage further comprises applying the first supply voltage to the drain terminal of the reset transistor in each of the unit pixels according to the inverted control signal, during reset periods other than the period from the exposure start time to just before the readout time.

* * * * *